(12) United States Patent
Imada

(10) Patent No.: US 10,603,617 B2
(45) Date of Patent: Mar. 31, 2020

(54) MICROWAVE IRRADIATION APPARATUS AND EXHAUST GAS PURIFICATION APPARATUS

(71) Applicant: FUJITSU LIMITED, Kawasaki-shi, Kanagawa (JP)

(72) Inventor: Tadahiro Imada, Kawasaki (JP)

(73) Assignee: FUJITSU Limited, Kawasaki (JP)

( * ) Notice: Subject to any disclaimer, the term of this patent is extended or adjusted under 35 U.S.C. 154(b) by 124 days.

(21) Appl. No.: 15/263,770

(22) Filed: Sep. 13, 2016

(65) Prior Publication Data

US 2017/0120179 A1    May 4, 2017

(30) Foreign Application Priority Data

Oct. 30, 2015 (JP) ................... 2015-215112

(51) Int. Cl.
| | | |
|---|---|---|
| *B01D 46/00* | (2006.01) | |
| *H05B 6/70* | (2006.01) | |
| *H05B 6/80* | (2006.01) | |

(52) U.S. Cl.
CPC ......... *B01D 46/0063* (2013.01); *H05B 6/707* (2013.01); *H05B 6/80* (2013.01); *B01D 2279/30* (2013.01); *H05B 2206/044* (2013.01); *H05B 2206/045* (2013.01)

(58) Field of Classification Search
None
See application file for complete search history.

(56) References Cited

U.S. PATENT DOCUMENTS

| 4,004,122 A * | 1/1977 | Hallier ................... B01J 19/126 |
| | | 219/697 |
| 5,180,559 A * | 1/1993 | Ma .......................... F01N 3/202 |
| | | 422/168 |
| 5,423,180 A * | 6/1995 | Nobue ..................... F01N 3/028 |
| | | 60/274 |
| 6,187,988 B1 * | 2/2001 | Cha ......................... A62D 3/178 |
| | | 204/157.3 |
| 6,740,858 B2 * | 5/2004 | Tracy ..................... F24H 1/101 |
| | | 210/748.07 |

(Continued)

FOREIGN PATENT DOCUMENTS

| CA | 1118845 A | 2/1982 |
| GB | 2023313 A | 12/1979 |

(Continued)

OTHER PUBLICATIONS

Office Action of Japanese Patent Application No. 2015-215112 dated Jun. 18, 2019 (7 sheets, 7 sheets translation, 14 sheets total).

*Primary Examiner* — Amber R Orlando
(74) *Attorney, Agent, or Firm* — Kratz, Quintos & Hanson, LLP

(57) ABSTRACT

A microwave irradiation apparatus includes: an annular microwave transmission path; a first microwave generation circuit that is coupled with the microwave transmission path and generates a first microwave; and a second microwave generation circuit that is coupled with the microwave transmission path and generates a second microwave; wherein the first microwave and the second microwave have frequencies equal to each other but have phases different from each other.

2 Claims, 7 Drawing Sheets

(56) References Cited

U.S. PATENT DOCUMENTS

| | | | |
|---|---|---|---|
| 2001/0003338 A1* | 6/2001 | Schulz | A61L 11/00 219/687 |
| 2012/0103975 A1 | 5/2012 | Okajima | |
| 2012/0326803 A1 | 12/2012 | Lee | |
| 2013/0062193 A1* | 3/2013 | Proudkii | B01J 3/08 204/157.15 |
| 2014/0377966 A1 | 12/2014 | Funk | |
| 2016/0339388 A1* | 11/2016 | Lee | B01D 53/72 |

FOREIGN PATENT DOCUMENTS

| | | |
|---|---|---|
| JP | S62-26158 B2 | 6/1987 |
| JP | H04-12113 | 1/1992 |
| JP | H04-179817 | 6/1992 |
| JP | H05-202733 | 8/1993 |
| JP | H07-139331 A | 5/1995 |
| JP | 2558877 B2 | 9/1996 |
| JP | 2006-140063 A1 | 6/2006 |
| JP | 2014-49276 A | 3/2014 |
| JP | 2014-175122 A1 | 9/2014 |
| JP | 2014-524106 A | 9/2014 |
| WO | WO 2011/070721 A1 | 6/2011 |
| WO | 2012/177834 A2 | 12/2012 |

* cited by examiner

FIG. 4A
FIG. 4B
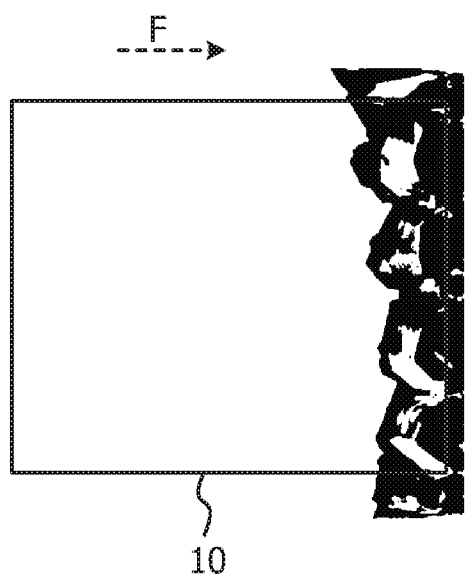

10

10

MICROWAVE IRRADIATION APPARATUS AND EXHAUST GAS PURIFICATION APPARATUS

CROSS-REFERENCE TO RELATED APPLICATION

This application is based upon and claims the benefit of priority of the prior Japanese Patent Application No. 2015-215112, filed on Oct. 30, 2015, the entire contents of which are incorporated herein by reference.

FIELD

The embodiments discussed herein are related to a microwave irradiation apparatus and an exhaust gas purification apparatus.

BACKGROUND

Currently, an exhaust gas purification apparatus in which a diesel particulate filter (DPF) is used is practically used as an apparatus that collects fine particles such as particulate matter (PM) contained in the exhaust gas. Since, in such an exhaust gas purification apparatus, fine particles such as PM are deposited on the DPF through use thereof, regeneration of the DPF is demanded. As a method for regenerating the DPF, for example, a method is disclosed in which a high-frequency electromagnetic wave such as a microwave irradiated from a microwave irradiation apparatus is used. In particular, according to the method, regeneration of the DPF is performed by irradiating an electromagnetic wave such as a microwave on the DPF to heat and combust fine particles such as PM deposited on the DPF.

A microwave irradiation apparatus is used also in a food heating apparatus for heating food, a chemical reaction apparatus or the like.

In the exhaust gas purification apparatus described above, regeneration of a DPF is performed by irradiating an electromagnetic wave such as a microwave on the DPF to dielectrically heat fine particles such as PM to oxidize and decompress the fine particles such as PM. However, it is difficult to irradiate a microwave, which is to be irradiated on the DPF, with a uniform intensity in the DPF, and a high intensity region and a low intensity region of the microwave appear in the DPF, resulting in unevenness of the temperature in the DPF. Therefore, fine particles such as PM are removed in some region while fine particles are not removed very much in another region in the DPF, and the DPF is not regenerated sufficiently. The phenomenon that a region which the intensity of an irradiated microwave is high and another region in which the intensity of the irradiated microwave is low appear in this manner similarly occurs also with a food heating apparatus, a chemical reaction apparatus and so forth.

Therefore, a microwave irradiation apparatus is demanded in which a region in which the intensity of an irradiated microwave is high and another region in which the intensity of the irradiated microwave is low are less likely to appear and a heating target may be heated uniformly.

The followings are a reference documents.
[Document 1] Japanese Laid-open Patent Publication No. 2006-140063
[Document 2] Japanese Laid-open Patent Publication No. 4-179817
[Document 3] Japanese Patent No. 4995351
[Document 4] Japanese Laid-open Patent Publication No. 05-202733
[Document 5] Japanese Laid-open Patent Publication No. 2014-175122

SUMMARY

According to an aspect of the embodiments, a microwave irradiation apparatus includes: an annular microwave transmission path; a first microwave generation circuit that is coupled with the microwave transmission path and generates a first microwave; and a second microwave generation circuit that is coupled with the microwave transmission path and generates a second microwave; wherein the first microwave and the second microwave have frequencies equal to each other but have phases different from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are intensity distribution diagrams of a microwave in the microwave irradiation apparatus depicted in FIG. 3;

DESCRIPTION OF EMBODIMENTS

In the following, embodiments for carrying out the technology are described. It is to be noted that like elements and so forth are denoted by like reference symbols and description of them is omitted herein.

As an example of a filter regeneration apparatus for an internal combustion engine, a filter regeneration apparatus of a structure is available in which a peripheral region of a DPF that is a heating target is covered with a waveguide and a microwave is supplied to the waveguide such that the microwave leaks from holes provided at the inner side of the waveguide and is irradiated on the DPF. However, in a filter regeneration apparatus of such a structure as just described, since a standing wave is formed in the waveguide by the microwave supplied to the waveguide, bellies and knots by the standing wave are formed. Therefore, a region in which the intensity of the microwave is high and another region in which the intensity of the microwave is low appear. It is to be noted that, in the present application, the phenomenon that a region in which the intensity of the microwave is high and another region in which the intensity of the microwave is low appear is referred to sometimes as an intensity distribution of the microwave appears.

First Embodiment

Figure 1B:
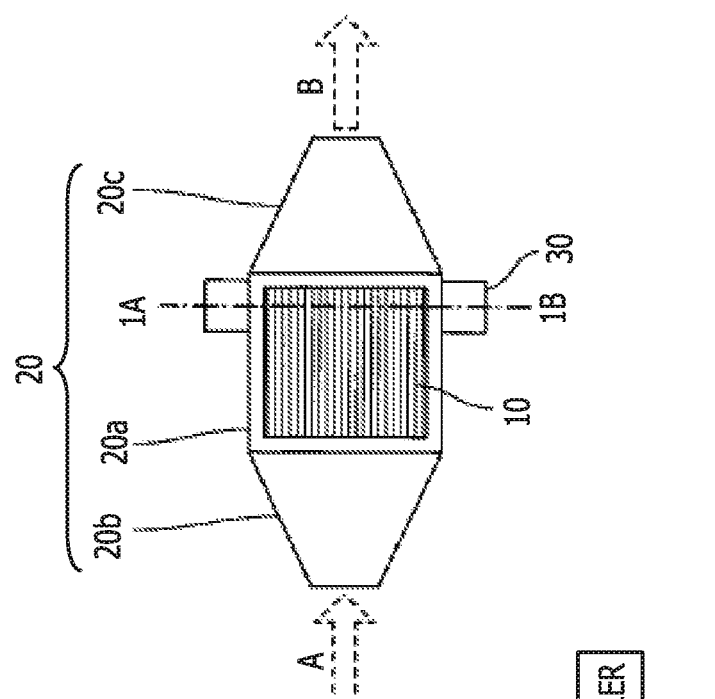
FIGS. 1A and 1B are schematic views depicting a structure of a microwave irradiation apparatus according to a first embodiment.
Figure 1A:
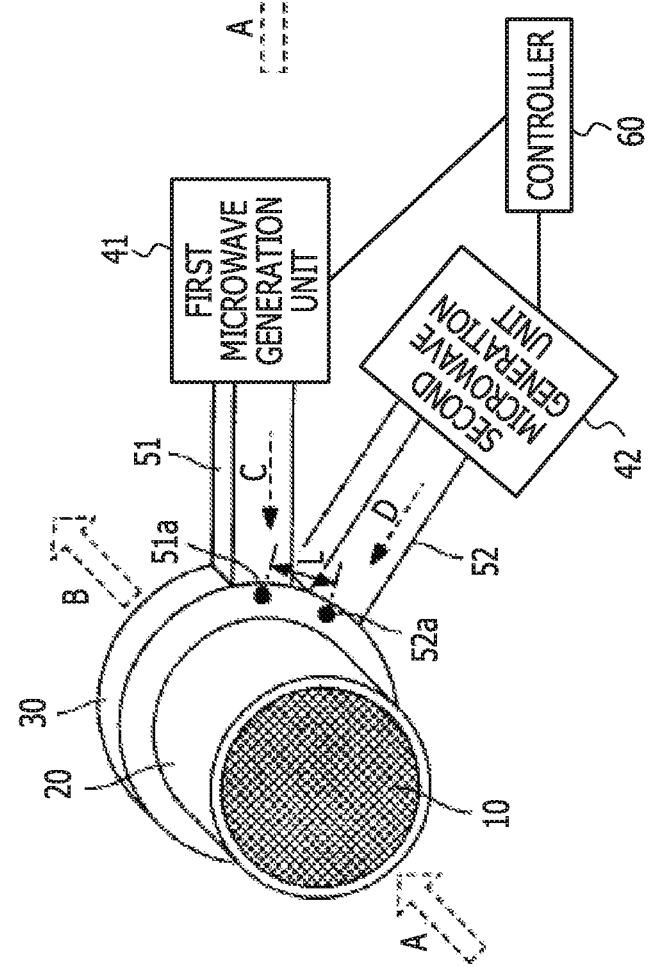

Now, a microwave irradiation apparatus according to a first embodiment is described with reference to FIGS. 1A and 1B. FIGS. 1A and 1B depict an exhaust gas purification apparatus to which the microwave irradiation apparatus according to the present embodiment is attached.

FIGS. 1A and 1B are schematic views of a structure of the microwave irradiation apparatus according to the present embodiment. In particular, FIG. 1A is a perspective view of part of the exhaust gas purification apparatus to which the microwave irradiation apparatus according to the present embodiment is attached, and FIG. 1B is a sectional view taken along a direction in which exhaust gas flows in the exhaust gas purification apparatus. The exhaust gas purification apparatus includes a fine particle collection unit 10, a housing 20, a first microwave generation unit 41, a second microwave generation unit 42, a controller 60 and so forth. A circular ring waveguide 30 that is a ring-formed microwave transmission path is provided around the cylindrical housing 20, and holes or the like not depicted are formed on the circular ring waveguide 30 at the housing 20 side that is an inner side of the circular ring waveguide 30 such that the microwave leaks to inside of the housing 20 and is irradiated on the fine particle collection unit 10.

The fine particle collection unit 10 is formed from a DPF or the like. The DPF is formed in a honeycomb structure in which vents adjacent each other are closed alternately, and exhaust gas is exhausted from vents different from vents that serve as entrances.

The housing 20 is formed from a metal material such as stainless steel, and includes a housing main portion 20a that covers the periphery of the fine particle collection unit 10, and an intake port 20b and a discharge port 20c coupled with the housing main portion 20a. In the exhaust gas purification apparatus according to the present embodiment, exhaust gas such as exhaust gas from an engine or the like is purified when it enters the housing 20 from the intake port 20b in a direction indicated by a broken line arrow mark A and passes the fine particle collection unit 10 installed in the housing main portion 20a. Thereafter, the exhaust gas purified in the fine particle collection unit 10 is exhausted in a direction indicated by a broken line arrow mark B from the discharge port 20c.

The first microwave generation unit 41 is coupled with the circular ring waveguide 30 by a first coupling waveguide 51, and the second microwave generation unit 42 is coupled with the circular ring waveguide 30 by a second coupling waveguide 52. A microwave generated by the first microwave generation unit 41 propagates in a direction indicated by a broken line arrow mark C in the first coupling waveguide 51 and is supplied into the circular ring waveguide 30. Meanwhile, a microwave generated by the second microwave generation unit 42 propagates in a direction indicated by a broken line arrow mark D in the second coupling waveguide 52 and is supplied into the circular ring waveguide 30.

It is to be noted that the frequency of the microwave generated by the first microwave generation unit 41 and the frequency of the microwave generated by the second microwave generation unit 42 are equal to each other. The microwave irradiation apparatus according to the present embodiment includes the circular ring waveguide 30, the first microwave generation unit 41, the second microwave generation unit 42, the first coupling waveguide 51, the second coupling waveguide 52, and the controller 60.

A distance L between a center 51a of the coupling portion between the circular ring waveguide 30 and the first coupling waveguide 51 and a center 52a of the coupling portion between the circular ring waveguide 30 and the second coupling waveguide 52 is formed so as to be equal to $(2N-1)\times\lambda/4$. It is to be noted that $\lambda$ is a wavelength of the microwave supplied to the circular ring waveguide 30 and N is a positive integer. Since preferably the distance L is not too long, it is preferable to set the distance L to $\lambda/4$, $3\lambda/4$, $5\lambda/4$, or $7\lambda/4$.

Figure 2:
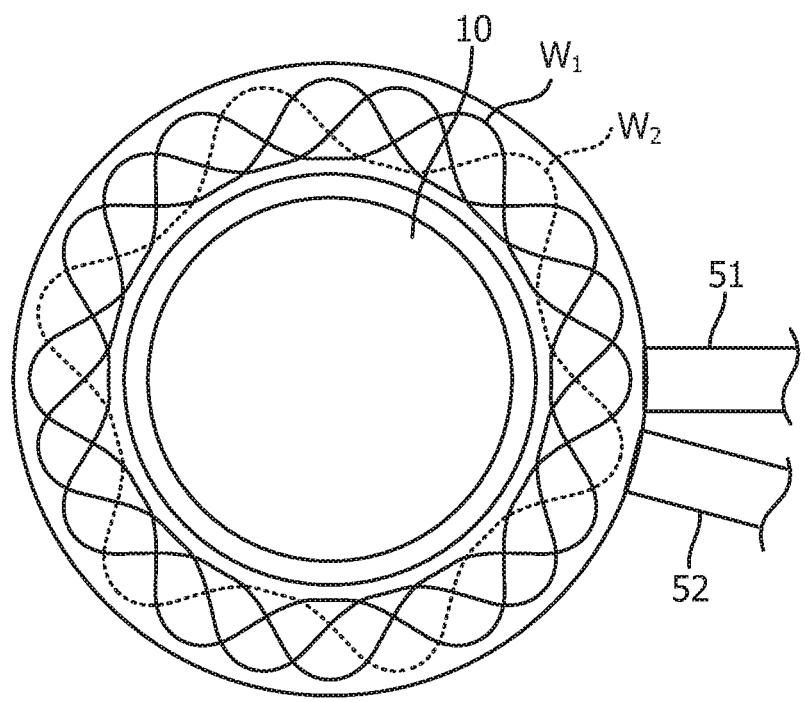
FIG. 2 is a schematic view illustrating a standing wave generated in a circular ring waveguide according to the first embodiment.

Further, the microwave supplied from the first microwave generation unit 41 to the circular ring waveguide 30 through the first coupling waveguide 51 and the microwave supplied from the second microwave generation unit 42 to the circular ring waveguide 30 through the second coupling waveguide 52 are displaced by $\pi/2$, namely, by $\lambda/4$, in phase from each other. Consequently, as depicted in FIG. 2, standing waves $W_1$ and $W_2$ are generated by the microwave generated by the first microwave generation unit 41 and the microwave generated by the second microwave generation unit 42 in the circular ring waveguide 30. It is to be noted that FIG. 2 is a sectional view taken along an alternate long and short dash line 1A-1B in FIG. 1B, and is a schematic view illustrating a standing wave generated in the circular ring waveguide according to the first embodiment.

In the present embodiment, the standing wave $W_1$ generated by the microwave from the first microwave generation unit 41 and the standing wave $W_2$ generated by the microwave from the second microwave generation unit 42 are displaced by $\pi/2$ in phase from each other. Accordingly, bellies of the standing wave $W_1$ generated by the microwave from the first microwave generation unit 41 correspond to knots of the standing wave $W_2$ generated by the microwave from the second microwave generation unit 42. Similarly, knots of the standing wave $W_1$ generated by the microwave from the first microwave generation unit 41 correspond to bellies of the standing wave $W_2$ generated by the microwave from the second microwave generation unit 42. Consequently, since the position of a knot of one of the standing waves corresponds to the position of a belly of the other one of the standing waves and the standing waves complement each other, an intensity distribution of the microwaves can be suppressed from appearing in the circular ring waveguide 30. In other words, such a situation may be suppressed that a region in which the intensity of the microwave is high and another region in which the intensity of the microwave is low appear in the circular ring waveguide 30. The microwaves in the circular ring waveguide 30 leak from the holes not depicted provided on the circular ring waveguide 30 at the fine particle collection unit 10 side that is the inner side of the circular ring waveguide 30 and is irradiated on the fine particle collection unit 10. Accordingly, in the present embodiment, since the intensity of the microwave irradiated on the fine particle collection unit 10 may be substantially uniformized, the fine particle collection unit 10 may be heated uniformly.

Further, in the present embodiment, the center 51a of the coupling portion between the circular ring waveguide 30 and the first coupling waveguide 51 functions as a knot of the standing wave $W_2$ generated by the microwave from the second microwave generation unit 42. Therefore, the microwave from the second microwave generation unit 42 does not advance into the first coupling waveguide 51. Similarly, the center 52a of the coupling portion between the circular ring waveguide 30 and the second coupling waveguide 52 functions as a knot of the standing wave $W_1$ generated by the microwave from the first microwave generation unit 41. Therefore, the microwave from the first microwave generation unit 41 does not advance into the first coupling waveguide 51.

The microwave irradiation apparatus according to the present embodiment may generate the microwaves at the same time from the first microwave generation unit 41 and the second microwave generation unit 42, or may generate the microwaves alternately. The control where the microwaves are alternately generated by the first microwave generation unit 41 and the second microwave generation unit 42 is performed by the controller 60.

Figure 3:
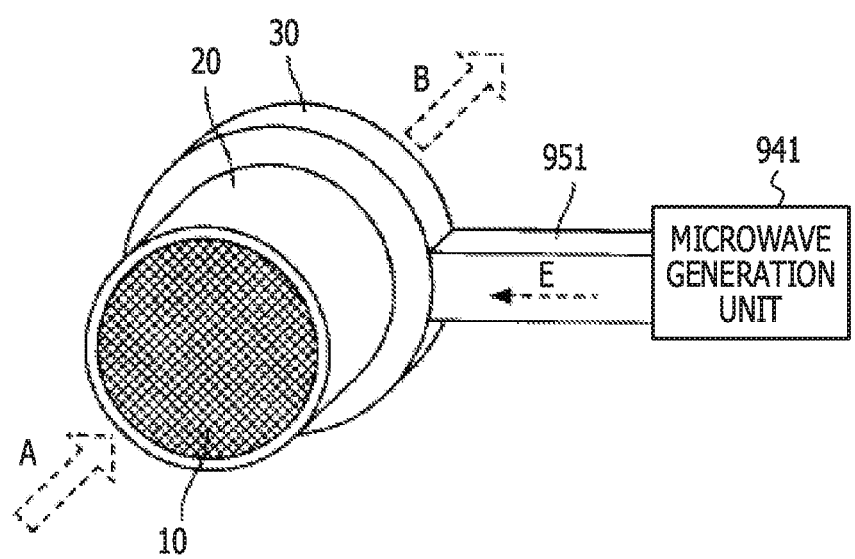
FIG. 3 is a schematic view depicting a structure of a microwave irradiation apparatus in which one microwave generation unit is coupled with a circular ring waveguide.

Now, intensity distributions of the microwave in the microwave irradiation apparatus according to the present embodiment depicted in FIG. 1 and a microwave irradiation apparatus that is depicted in FIG. 3 and includes a single microwave generation unit are described. The microwave irradiation apparatus depicted in FIG. 3 and including a single microwave generation unit includes a fine particle collection unit 10, a housing 20, a microwave generation unit 941 and so forth. The circular ring waveguide 30 is provided around the cylindrical housing 20, and a microwave generation unit 941 is coupled with the circular ring waveguide 30 by a coupling waveguide 951. In particular, the microwave irradiation apparatus depicted in FIG. 3 is structured such that the single microwave generation unit 941 is coupled with the circular ring waveguide 30 by the coupling waveguide 951.

A microwave generated by the microwave generation unit 941 propagates in a direction indicated by a broken line arrow mark E in the coupling waveguide 951 and is supplied into the circular ring waveguide 30. The microwave supplied into the circular ring waveguide 30 forms a standing wave in the circular ring waveguide 30 and is irradiated on the fine particle collection unit 10.

Figure 5A:
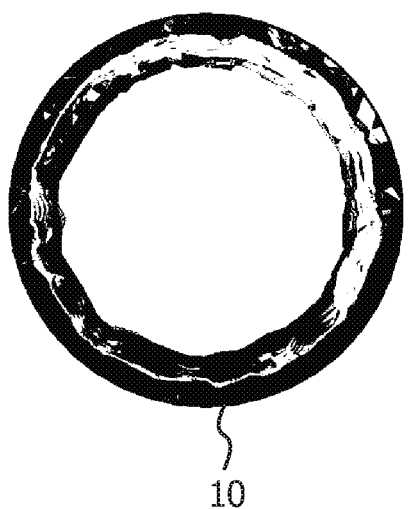
FIGS. 5A and 5B are intensity distribution diagrams of a microwave in the microwave irradiation apparatus according to the first embodiment.
Figure 5B:
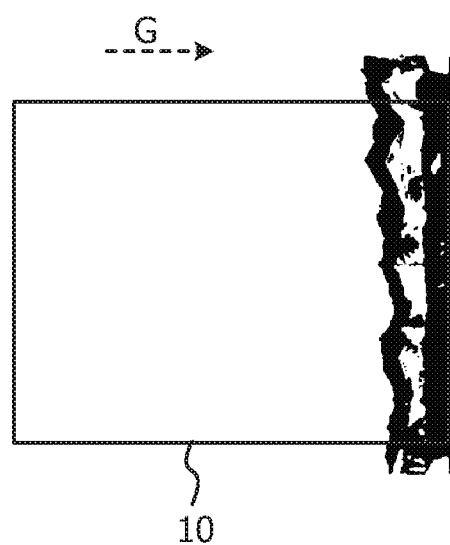

FIGS. 4A and 4B depict intensity distribution of the microwave irradiated by the microwave irradiation apparatus depicted in FIG. 3 and including the single microwave generation unit. In particular, FIG. 4A depicts an intensity distribution of the microwave of the fine particle collection unit 10 in a direction perpendicular to a flowing direction of exhaust gas, and FIG. 4B depicts an intensity distribution of the microwave of the fine particle collection unit 10 in the flowing direction of exhaust gas indicated by a broken line arrow mark F. Further, FIGS. 5A and 5B depict intensity distribution of the microwave irradiated by the microwave irradiation apparatus according to the present embodiment. In particular, FIG. 5A depicts an intensity distribution of the microwave of the fine particle collection unit 10 in a direction perpendicular to a flowing direction of exhaust gas, and FIG. 5B depicts an intensity distribution of the microwave of the fine particle collection unit 10 in the flowing direction of exhaust gas indicated by a broken line arrow mark G.

In the microwave irradiation apparatus depicted in FIG. 3 and including a single microwave generation unit, the difference between a region in which the intensity of the microwave is high and another region in which the intensity of the microwave is low is great as depicted in FIGS. 4A and 4B. In this manner, if the difference between a region in which the intensity of the microwave is high and another region in which the intensity of the microwave is low is great, then temperature unevenness occurs in the fine particle collection unit 10. Therefore, a region in which fine particles such as PM are removed and another region in which fine particles are not removed very much appear and regeneration of the fine particle collection unit 10 may not be performed sufficiently.

The reason why the difference between a region in which the intensity of the microwave is high and another region in which the intensity of the microwave is low is great in this manner is that a single microwave is supplied to the circular ring waveguide 30 and an intensity distribution of the microwave appears in response to bellies and knots of the standing wave generated by the supplied microwave.

In contrast, as depicted in FIGS. 5A and 5B, in the microwave irradiation apparatus according to the present embodiment, the difference between a region in which the intensity of the microwave is high and another region in which the intensity of the microwave is low is reduced. Where the difference between a region in which the intensity of the microwave is high and another region in which the intensity of the microwave is low is small in this manner, in the fine particle collection unit 10, little temperature unevenness appears and heating is performed substantially uniformly. Consequently, removal of fine particles such as PM in the fine particle collection unit 10 may be performed uniformly and regeneration of the fine particle collection unit 10 may be performed sufficiently.

The reason why the difference between a region in which the intensity of the microwave is high and another region in which the intensity of the microwave is low is reduced in the microwave irradiation apparatus according to the present embodiment in this manner is that two microwaves whose phases are displayed by $\pi/2$ from each other are supplied to the circular ring waveguide 30. Consequently, in the circular ring waveguide 30, knots of the standing wave generated by one of the microwaves correspond to bellies of the standing wave generated by the other one of the microwaves while knots of the standing wave generated by the other one of the microwaves correspond to bellies of the standing wave generated by one of the microwaves. In the present embodiment, the difference between a region in which the intensity of the microwave is high and another region in which the intensity of the microwave is low may be reduced as described above, and the fine particle collection unit 10 may be heated substantially uniformly by the irradiated microwaves.

It is to be noted that the microwave irradiation apparatus according to the present embodiment may be applied not only for regeneration of the fine particle collection unit 10 but also to a heating apparatus that heats food or the like by a microwave, a chemical reaction apparatus and so forth.

Second Embodiment

Figure 6:
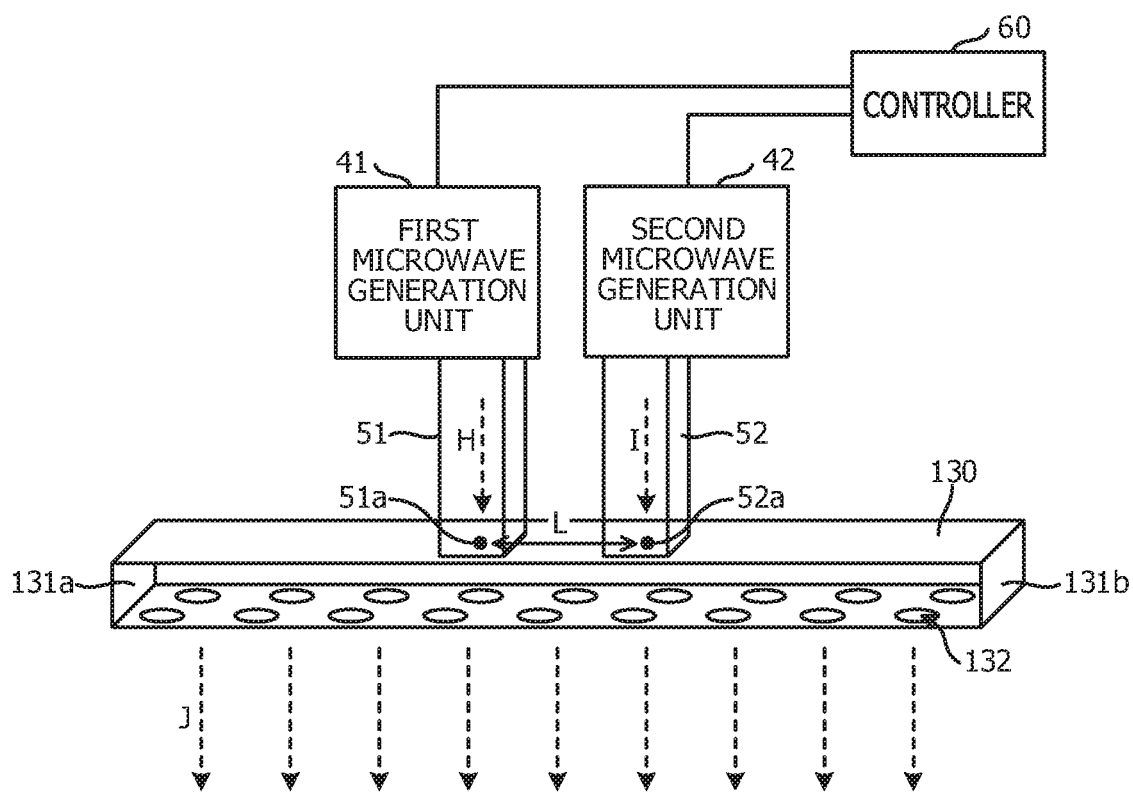
FIG. 6 is a schematic view depicting a structure (1) of a microwave irradiation apparatus according to a second embodiment.

Now, a second embodiment is described. FIG. 6 is a schematic view depicting a structure (1) of a microwave irradiation apparatus according to the second embodiment. The microwave irradiation apparatus according to the present embodiment includes, as depicted in FIG. 6, a microwave transmission path 130, a first microwave generation unit 41, a second microwave generation unit 42, a first coupling waveguide 51, a second coupling waveguide 52, and a controller 60.

The microwave transmission path 130 is formed in a tubular shape having a quadrangular cross section and has reflection walls 131a and 131b provided at the opposite ends thereof such that they reflect a microwave. A plurality of opening holes 132 for radiating a microwave there through are provided in a wall of the tubular portion between the reflection wall 131a and the reflection wall 131b.

The first microwave generation unit 41 is coupled with the microwave transmission path 130 by the first coupling waveguide 51, and the second microwave generation unit 42 is coupled with the microwave transmission path 130 by the second coupling waveguide 52. A distance L between a center 51a of the coupling portion between the microwave transmission path 130 and the first coupling waveguide 51 and a center 52a of the coupling portion between the microwave transmission path 130 and the second coupling waveguide 52 is formed so as to be equal to $(2N-1) \times \lambda/4$. It is to be noted that $\lambda$ is a wavelength of the microwave supplied to the microwave transmission path 130 and N is a positive integer. Since preferably the distance L is not too long, preferably the distance L is set to $\lambda/4$, $3\lambda/4$, $5\lambda/4$, or $7\lambda/4$.

The microwave generated by the first microwave generation unit 41 propagates in a direction indicated by a broken line arrow mark H in the first coupling waveguide 51 and is supplied into the microwave transmission path 130. Meanwhile, the microwave generated by the second microwave generation unit 42 propagates in the second coupling waveguide 52 in a direction indicated by a broken line arrow mark I and is supplied into the microwave transmission path 130.

In the present embodiment, the microwave supplied from the first microwave generation unit 41 to the microwave transmission path 130 through the first coupling waveguide 51 is reflected by the reflection wall 131a and the reflection wall 131b of the microwave transmission path 130 to form a standing wave. Similarly, the microwave supplied from the second microwave generation unit 42 to the microwave transmission path 130 through the second coupling waveguide 52 is reflected by the reflection wall 131a and the reflection wall 131b of the microwave transmission path 130 to form a standing wave. Since the microwave supplied from the first microwave generation unit 41 and the microwave supplied from the second microwave generation unit 42 are displaced by $\pi/2$, namely, by $\lambda/4$, in phase from each other, also the phases of the two standing waves generated in the microwave transmission path 130 are displaced by $\pi/2$ from each other.

Accordingly, in the microwave transmission path 130, knots of the standing wave generated by one of the microwaves correspond to bellies of the standing wave generated by the other one of the microwaves while knots of the standing wave generated by the other one of the microwaves correspond to bellies of the standing wave generated by the one of the microwaves. Consequently, the microwave irradiation apparatus according to the present embodiment may reduce the difference between a region in which the intensity of the microwave is high and another region in which the intensity of the microwave is low and may irradiate the microwave having a substantially uniform intensity in a direction indicated by a broken line arrow mark J through the opening holes 132. Therefore, a heating target placed in the direction indicated by the broken line arrow mark J may be heated substantially uniformly.

Figure 7:
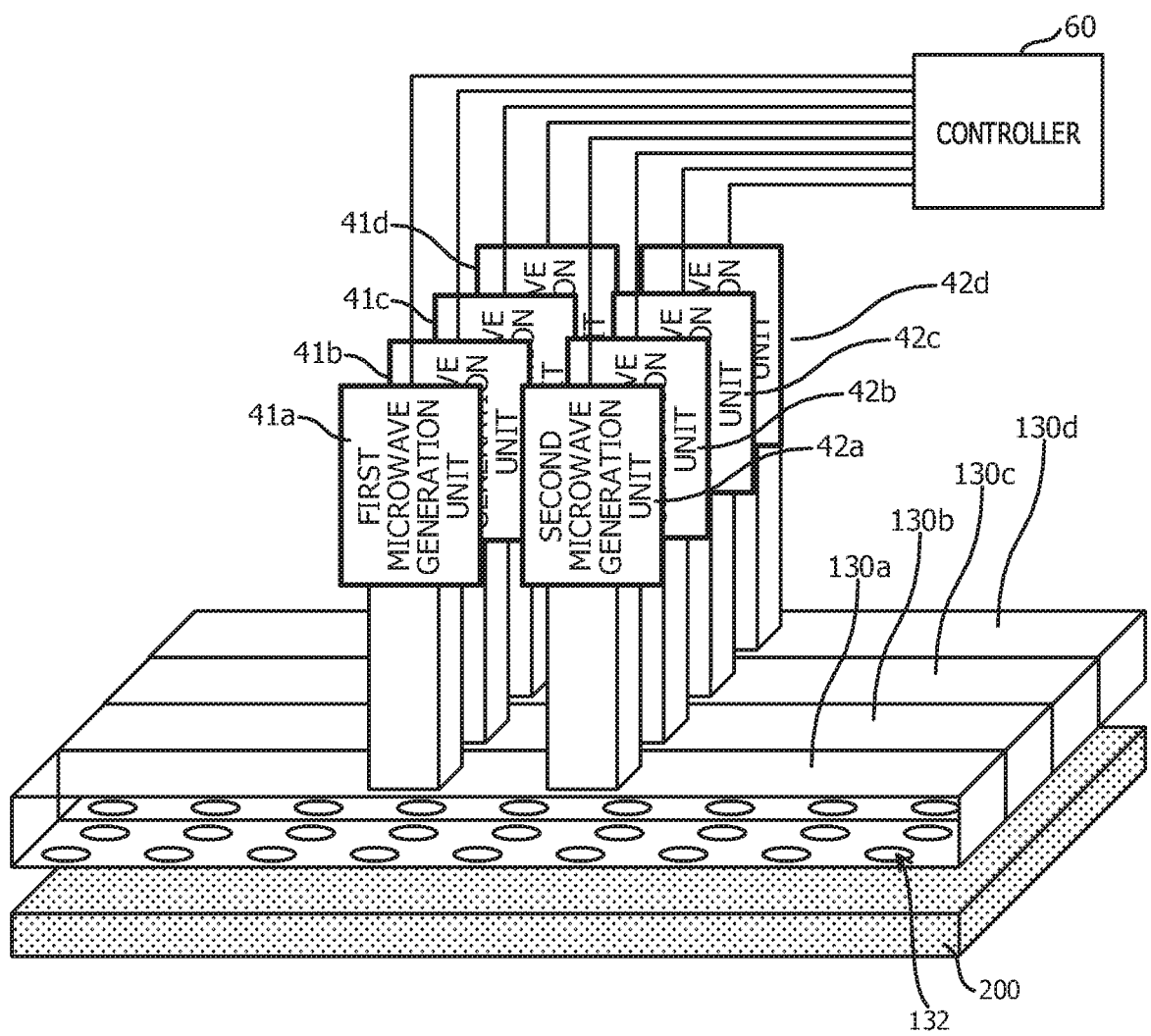
FIG. 7 is a schematic view depicting another structure (2) of the microwave irradiation apparatus according to the second embodiment.

FIG. 7 is a schematic view depicting another structure (2) of the microwave irradiation apparatus according to the second embodiment. As described in FIG. 7, the microwave irradiation apparatus structured such that a plurality of microwave irradiation units, each of which may be the microwave irradiation apparatus of FIG. 6 except the controller, are juxtaposed such that they may heat substantially uniformly over a wide area. In particular, the microwave irradiation units are installed in a juxtaposed relationship in a lateral direction such that the orientations of opening portions in a plurality of microwave transmission paths 130a, 130b, 130c, and 130d are same as each other. Thus, the microwave irradiation units may heat a heating target 200, which has a wide area and is placed at the side of the opening portions, substantially uniformly.

It is to be noted that, in the microwave irradiation apparatus of FIG. 7, a first microwave generation unit 41a and a second microwave generation unit 42a are coupled with the microwave transmission path 130a, and another first microwave generation unit 41b and another second microwave generation unit 42b are coupled with the microwave transmission path 130b. Further, a first microwave generation unit 41c and a second microwave generation unit 42c are coupled with the microwave transmission path 130c, and another first microwave generation unit 41d and another second microwave generation unit 42d are coupled with the microwave transmission path 130d. It is to be noted that the first microwave generation units 41a, 41b, 41c, and 41d and the second microwave generation unit 42a, 42b, 42c, and 42d are coupled with the controller 60.

It is to be noted that the configuration of the other part of the microwave irradiation apparatus is similar to that of the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A microwave irradiation apparatus comprising:
   an annular microwave transmission path;
   a first microwave generation circuit that is coupled with the microwave transmission path and generates a first microwave;
   a first coupling waveguide that couples the microwave transmission path and the first microwave generation circuit with each other;
   a first coupling portion that couples the microwave transmission path and the first coupling waveguide;
   a second microwave generation circuit that is coupled with the microwave transmission path and generates a second microwave whose phase difference with the first microwave is $\pi/2$ and whose frequency is equal to the first microwave;
   a second coupling waveguide that couples the microwave transmission path and the second microwave generation circuit with each other: and
   a second coupling portion that couples the microwave transmission path and the second coupling waveguide and where the distance between the center of the second coupling portion and the center of the first coupling portion is one of $\lambda/4$, $3\lambda/4$, $5\lambda/4$, and $7\lambda/4$ where $\lambda$ represents a wavelength of the first and second microwaves.

2. An exhaust gas purification apparatus comprising:
   a fine particle collection circuit that collects fine particles contained in exhaust gas;
   a housing that covers the fine particle collection circuit;

an annular microwave transmission path that is formed around the housing and irradiates a microwave on the fine particle collection circuit;
a first microwave generation circuit that is coupled with the microwave transmission path and generates a first microwave;
a first coupling waveguide that couples the microwave transmission path and the first microwave generation circuit with each other;
a first coupling portion that couples the microwave transmission path and the first coupling waveguide;
a second microwave generation circuit that is coupled with the microwave transmission path and generates a second microwave whose phase difference with the first microwave is $\pi/2$ and whose frequency is equal to the first microwave;
a second coupling waveguide that couples the microwave transmission path and the second microwave generation circuit with each other: and
a second coupling portion that couples the microwave transmission path and the second coupling waveguide and where the distance between the center of the second coupling portion and the center of the first coupling portion is one of $\lambda/4$, $3\lambda/4$; $5\lambda/4$, and $7\lambda/4$ where $\lambda$ represents a wavelength of the first and second microwaves.

* * * * *